US012013296B2

(12) United States Patent
Bittner et al.

(10) Patent No.: US 12,013,296 B2
(45) Date of Patent: Jun. 18, 2024

(54) STRAIN-MEASURING STRUCTURE HAVING A STRUCTURED CARRIER

(71) Applicant: Hahn-Schickard-Gesellschaft für angewandte Forschung e. V., Villingen-Schwenningen (DE)

(72) Inventors: Achim Bittner, Heilbronn (DE); Bernd Folkmer, Constance (DE); Mohamed Bourouah, Villingen-Schwenningen (DE)

(73) Assignee: HAHN-SCHICKARD-GESELLSCHAFT FÜR ANGEWANDTE FORSCHUNG E. V., Villingen-Schwenningen (DE)

( * ) Notice: Subject to any disclaimer, the term of this patent is extended or adjusted under 35 U.S.C. 154(b) by 560 days.

(21) Appl. No.: 17/288,473

(22) PCT Filed: Oct. 24, 2019

(86) PCT No.: PCT/EP2019/079015
§ 371 (c)(1),
(2) Date: Apr. 23, 2021

(87) PCT Pub. No.: WO2020/084043
PCT Pub. Date: Apr. 30, 2020

(65) Prior Publication Data
US 2021/0389194 A1    Dec. 16, 2021

(30) Foreign Application Priority Data
Oct. 24, 2018  (EP) ..................... 18202283

(51) Int. Cl.
*G01L 1/22* (2006.01)
*G01B 7/16* (2006.01)
(52) U.S. Cl.
CPC .............. *G01L 1/2293* (2013.01); *G01B 7/16* (2013.01)

(58) Field of Classification Search
CPC ... G01L 1/2206; G01L 1/2287; G01L 1/2293; G01B 7/16; G01B 7/22
See application file for complete search history.

(56) References Cited

U.S. PATENT DOCUMENTS

| 6,578,434 B1 | 6/2003 | Maubant et al. |
| 2017/0059418 A1 | 3/2017 | Keller et al. |
| 2018/0275001 A1* | 9/2018 | Tokuda ..................... G01L 9/06 |

FOREIGN PATENT DOCUMENTS

WO    WO 96/22515 A1    7/1996

OTHER PUBLICATIONS

International Search Report in PCT/EP2019/079015, dated Dec. 17, 2019.

* cited by examiner

*Primary Examiner* — Erika J. Villaluna
(74) *Attorney, Agent, or Firm* — Knobbe, Martens, Olson & Bear, LLP (57) ABSTRACT

The invention relates to a strain-measuring structure, comprising a carrier, which is divided into regions along the predetermined breaking points only after being joined to the object to be measured. After the separation along the predetermined breaking points, the regions individually joined in the joining zones can be moved freely relative to one another in the event of strain of the object, without the strain-measuring structure applying significant forces to the object to be measured, which could distort the strain measurement. Measuring assemblies for measuring strain lie between the regions. Said measuring assemblies can be based on different principles, depending on the application. The invention further relates to a method for producing the strain-measuring structure, to a method for measuring the strain of objects, and to the use of the structure to measure strain. The invention further preferably relates to a system (Continued)

comprising the strain-measuring structure and a control device for reading out and preferably activating and joining the structure.

21 Claims, 3 Drawing Sheets

STRAIN-MEASURING STRUCTURE HAVING A STRUCTURED CARRIER

FIELD

The invention relates to a strain-measuring structure, comprising a carrier, which is divided into regions along the predetermined breaking points only after being joined to the object to be measured. After the separation along the predetermined breaking points, the regions individually joined in the joining zones can be moved freely relative to one another in the event of strain of the object, without the strain-measuring structure applying significant forces to the object to be measured, which could distort the strain measurement. Measuring assemblies for measuring strain lie between the regions. Said measuring assemblies can be based on different principles, depending on the application. The invention further relates to a method for producing the strain-measuring structure, to a method for measuring the strain of objects, and to the use of the structure to measure strain. The invention further preferably relates to a system comprising the strain-measuring structure and a control device for reading out and preferably activating and joining the structure.

BACKGROUND AND PRIOR ART

Strain measurements on objects are carried out for dimensioning and evaluating mechanically stressed components, for example. In order to properly dimension mechanically stressed components according to their function, it is necessary to have knowledge of the type of stress. The determining parameters for the design are the maximum stresses that occur, which ultimately determine the dimensions. These stresses need to be determined in advance and then checked experimentally in an experiment. Experimental stress analysis can thus be viewed as a link between the theoretical calculations and the verifications during the experiments. Strain gauges, or strain sensors in general, are used for such a stress analysis.

Furthermore, the experimental analysis of strains is required in the course of machine condition monitoring to record and document changing stresses, e.g., due to changes over time in the boundary and operating conditions as well as in the material properties.

Due to the component geometry and the load application, the stress condition is a function of the location. The magnitudes of the principal stresses as well as their principal directions vary across the surface. The local stress peaks are usually located in the vicinity of significant dimensional variations, such as shoulders, notches, etc. Significant gradients exist in their vicinity. The stress condition is established via a deformation or strain measurement. Even in cases of high component stress (stressed to just before the breaking point), there are only very small deformations or strains (approx. 1-2‰) in commonly used, mostly metallic materials. Components that are subjected to purely mechanical loads experience the highest stresses on the component surface. The measurement therefore preferably takes place on the surface. Sensitive measurement structures must therefore be introduced and applied locally, as closely as possible connected to the test object.

Often a multi-axial stress condition has to be measured. As long as there is no additional normal load (e.g., pressure), usually a biaxial stress condition is present on the surfaces of objects to be measured. As a rule, however, its main directions are unknown. Strain gauge rosettes, which have multiple strain gauges in different directions, fulfill the important task of fully determining a biaxial stress/strain condition within the experimental stress analysis, as it has been proven that the main strains can be determined with three independent strain measurements in different directions. Even if the main directions are known, two independent strain measurements are still required to determine them. Known arrangements from the prior art are the 45° right-angle rosette and the 60° delta rosette.

Strain gauges are based on the change in electrical resistance due to changes in length and cross-section. If a strain gauge is expanded, its resistance increases. If it is compressed (negative strain), its resistance decreases. Herein, $dR/R = k \cdot \varepsilon$ applies, wherein $\varepsilon$ corresponds to the relative change in length.

Problem areas of metallic strain gauges are low k-factors and the resulting low sensitivities as well as large strain gauges and therefore poor spatial resolution, especially with rosettes in which, due to the size of the strain gauges, measurements are carried out on different axes at different locations, resulting in an incorrect result.

In contrast, semiconductor strain gauges allow for significantly more sensitive measurements. However, the mechanical sensitivity of these strain gauges is also very high, the assembly is therefore complex and the strain gauge often breaks nonetheless. In addition, these semiconductor strain gauges are often rigidly glued over the entire surface of the object to be measured, often to increase the stability of the strain gauge. Therein, the mechanical properties of the adhesive often influence and distort the strain measurement.

In general, there are also problems with the strain gauge measurement methods known from the prior art, in particular with the bridge circuits usually used with only 1 or 2 active, relatively large strain gauges at different locations on the component and the bridge circuit being supplemented with passive resistors, which in particular leads to poor temperature compensation and low sensitivities.

So-called sidewall MEMS are known from WO 2010139034 A2, which are MEMS structures with intentional impurities in the side walls, which results in the formation of piezoresistive regions. These can be used as sensors for measuring the stresses of the MEMS component itself. This results in advantages from the possibilities of structuring semiconductors for MEMS technology, e.g., high design flexibility, high sensitivities of possible sensors, no material fatigue of the MEMS structures, compatibility with CMOS technology, universality of the production technology and simplicity of the structures due to the integrated sensors. Depending on the design with multiple measuring resistors, it also results in a good, inherent temperature compensation due to the proximity of the measuring resistors to one another within the MEMS component.

However, a use of such structures for measuring the strains of external objects is unknown. This also presents some challenges, such as a measurement of the entire stiffness matrix of the semiconductor (silicon) structure and its high stiffness in general, and a possible temperature drift of the sensors. So far, these challenges could not be overcome in the prior art.

OBJECT OF THE INVENTION

The problem underlying the invention is to provide a strain-measuring structure without the disadvantages of the prior art. In particular, a problem underlying the invention was to provide a strain-measuring structure which is highly sensitive and compact, but is robust, easy to store and attach, and has low susceptibility to errors.

SUMMARY OF THE INVENTION

The problem is solved by the features of the independent claims. Advantageous embodiments of the invention are described in the dependent claims.

A strain-measuring structure for measuring strain on an object, comprising
  a structured carrier,
  at least one measuring assembly for uniaxial strain measurement,
characterized in that the carrier has at least two regions which are separated from one another by a predetermined breaking point, wherein the measuring assembly is present between two regions, each region can be joined to the object in a joining zone and wherein the predetermined breaking point is configured to activate the strain-measuring structure by separating the carrier into the regions.

Due to the contiguous carrier, which is only divided into regions along the predetermined breaking points after being joined to the object to be measured, the strain-measuring structure is particularly robust and easy to handle before being joined. After the separation along the predetermined breaking points, the regions individually joined in the respective joining zones can be moved freely relative to one another in the event of strain of the object, without the strain-measuring structure applying significant forces to the object to be measured that could distort the strain measurement. Measuring assemblies for measuring strain can lie between the regions. Said measuring assemblies can be based on different principles, depending on the application. Both a separation of the carrier and a joining can be remotely controlled, e.g., via an electrical control and a suitable joining and separation principle. The device is particularly suitable for very miniaturized or difficult to access strain-measuring structures and automated measurements.

The strain-measuring structure is used to measure the strain on an object. The object can preferably be any type of mechanically stressed component, the stress of which is noticeable in the form of a strain on the object and can be measured by means of a strain measurement. A strain (often denoted by the symbol $\varepsilon$) indicates a relative change in length of the body of an object, which can be a lengthening or a shortening. Strains preferably occur under the application of force and/or during a temperature change. An enlargement of the object is referred to as positive strain or expansion, otherwise it is referred to as negative strain or compression. A strain is preferably defined as $\varepsilon = \Delta l / l_0$, wherein $\Delta l$ represents the change in length and $l_0$ the initial length. In a resistive strain measurement, in which strain causes a change in resistance $\Delta R$, the k-factor is the constant of proportionality between the strain and the relative change in resistance and is therefore a measure of the sensitivity of the strain measurement: $\Delta R/R = k \cdot \varepsilon$.

A strain measurement can in principle be carried out at any point and along any direction (s) of an object. However, a strain measurement is preferably carried out at least along one (preferably straight) direction or axis within an area which can lie inside and/or outside of an object. Such an area can be a surface of the object, e.g., but it can also be a separation surface between multiple components of a composite object, for example in the case of an embedding in a laminate along an inner surface.

A structured carrier is a preferably robust and suitably shaped element which, according to its name, carries the measuring assembly of the strain-measuring structure, which preferably offers a stable and compact platform and can form a connection between the measuring assembly and the object to be measured. The carrier can take many forms, for example, it can be rod-shaped or have the form of a frame-like structure.

A measuring assembly for uniaxial strain measurement preferably contains all of the elements that are fundamentally essential for measuring the strain of the object. Strain measurements can be implemented in various ways, for example through the changes in resistance of the sensor material used in the case of the known strain gauges. However, strain measurements by measuring a change in capacitance in the event of a change in the distance from electrodes caused by the strain are also conceivable. Optical distance measurements, for example, are also possible as a basic principle of strain measurement. Therein, the measuring assembly comprises the elements essential for the basic measuring principle, such as (piezo-)resistive elements for classic strain measurement, electrodes for capacitive measurement or suitable optical elements for optical strain measurement, etc. The structured carrier is, however, preferably indispensable as a platform for the measuring assembly, for imparting stability and anchoring with the object to be measured. A uniaxial measuring assembly preferably relates to the essential direction of the strain measurement. This is preferably represented by a straight line which indicates the preferred measuring direction or the axis of the measuring assembly. This in turn is given in particular by the structure of the measuring assembly and the underlying measuring principle. A measuring assembly based on a change in resistance is typically configured, e.g., to measure strains essentially along its longitudinal direction. A capacitive strain measurement also essentially measures, for example, strains along the normal to the electrodes. However, measurements can preferably also be carried out partially along other directions which have a portion transverse to the preferred direction. The measuring assembly preferably has essentially two end points or sides, between which the uniaxial measurement preferably takes place and the connecting section of which represents the preferred measuring direction. This is preferably essentially a connection path along the measuring assembly between the two regions between which the measuring assembly is present.

Terms such as 'essentially,' approximately, 'about,' etc. preferably describe a tolerance range of less than ±40%, preferably less than ±20%, particularly preferably less than ±10%, even more preferably less than ±5% and in particular less than ±1%. The term 'similar' preferably describes sizes that are approximately the same. The term 'partly' describes preferably portions of at least 5%, particularly preferably of at least 10%, and in particular of at least 20%, in some cases of at least 40%.

The carrier has at least two regions which are separated from one another by a predetermined breaking point. A predetermined breaking point is a point at which the structure of the carrier is preferably intentionally weakened such that a separation or a deliberately induced breaking of the carrier can be carried out along this predetermined breaking point. The predetermined breaking point should be configured in such a way that the regions of the carrier in the original state are connected to one another in a non-positive or positive-locking manner, such that the regions of the carrier form a unit. However, the predetermined breaking point is designed in such a way that the carrier can be divided into the regions by the application of energy introduced along it, preferably without adversely affecting the remaining strain-measuring structure and its functionality.

Each region can be joined to the object to be measured in a joining zone. Joining means in particular connecting with one another in a non-positive and/or positive-locking manner, for example by welding, gluing, soldering, riveting, clinching and/or screwing. A suction connection based on negative pressure between the object and the joining zone is also conceivable. Therein, the joining zone is a zone of the region which is intended for joining with the object to be measured. A joining zone can be present, for example, on a smooth surface of the region on an underside of the measuring assembly, which preferably forms the connection surface with the object to be measured and the strain-measuring structure. The joining zone is preferably as small as possible, such that the strain-measuring structure is not connected to the object to be measured over a large area, but rather at specific points. However, the joining zone is preferably sufficiently large to ensure a non-positive and/or positive-locking connection of the strain-measuring structure even under the greatest possible, typically expected strains of the object. Therein, each region preferably has exactly one joining zone. However, it can also be preferred to join at least one region to the object via more than one joining zone. The joining zone can preferably be suitable for joining to the object, for example, via a specially treated surface, which is roughened, e.g. Likewise, the joining zone can already have connecting elements such as an adhesive (which preferably can be activated).

The measuring assembly is located between two regions that can be separated from one another via the predetermined breaking point. This means in particular that the measuring assembly is preferably suitable for recognizing a change in the distance of the regions due to a strain along the uniaxial strain measurement. The elements preferred for the respective measuring principle are in particular divided between these two regions in such a way that this measurement is made possible. For example, the measuring assembly can be mounted between the regions for carrying out resistive strain measurements and be connected to one region on each of the transverse sides. In this case, the transverse side preferably denotes a side of the measuring assembly transverse to the preferred measuring direction or axis. A measuring assembly for carrying out capacitive strain measurements can preferably have at least one electrode each present in, and connected to, a region.

The predetermined breaking point is configured to activate the strain-measuring structure by separating the carrier into the regions. This means in particular that the carrier can be divided into regions along the predetermined breaking point by introducing an external force and/or energy. Activation also means that the strain-measuring structure is put into a state which is particularly suitable for measuring strain of the object to be measured. This is particularly the case when the carrier no longer represents a unit, but is divided into the regions, between which there is preferably at least one measuring assembly. In this case, the regions are preferably only the platforms of the two sides or end points of the measuring assembly, between which a distance measurement is carried out. After activation, the regions are preferably no longer in direct connection with one another and can be moved relative to one another essentially without resistance by straining the object, such that a strain of the object between the joining zones of the region can preferably be measured. In particular, the object is only in direct contact with the strain-measuring structure at certain points, such that the strain of the object is not influenced by the structure, for example via large adhesive surfaces. Therein, the measuring assemblies are advantageously arranged exactly between these joining zones, which occur only in points. In this way, a surprisingly precise strain measurement can be carried out. There is essentially no reaction of the strain-measuring structure on the test object. There are also only minimal requirements for the adhesive with regard to its stiffness or elasticity, such that the joining technique can be greatly simplified.

The separation of the carrier into regions can preferably be carried out without manual manipulation, for example by heating and melting the predetermined breaking point with an electric heating wire. This contributes to a complete automation of a strain measurement process, which is very advantageous in particular in strain measurements at inaccessible locations of an object and/or a particularly miniaturized strain-measuring structure.

Activation after joining with the object offers the advantage that the strain-measuring structure is particularly robust prior to activation due to the contiguous carrier and can be easily handled. Joining is also very easily possible without complex positioning of the individual regions, with the measuring assembly or assemblies being essentially in their neutral position, in which they are preinstalled on the contiguous carrier, without any further intervention.

Once joined to the object and activated, the measuring assembly is essentially free-standing between the regions and is only connected to the object via the joining zone of each region. The measuring assembly therefore essentially does not exert any forces on the object to be measured. Due to the lack of forces opposing the strain on the object by the carrier, large-area adhesive zones and the measuring assembly itself, the precision of the strain measurement can be synergistically increased.

Therein, the size of the strain-measuring structure can preferably be very different and be between multiple centimeters (cm) and (sub-)micrometers (µm).

In a preferred embodiment of the invention, the measuring assembly is configured for a resistive, preferably a piezoresistive, a piezoelectric, an optical, a magnetic, an inductive and/or a capacitive strain measurement. Therein, a measuring assembly can comprise a single element, which allows for a resistive, preferably a piezoresistive, a piezoelectric, an optical, a magnetic, an inductive and/or a capacitive strain measurement; it can also be preferred that a measuring assembly comprises multiple such elements.

Resistive and piezoresistive measuring assemblies are based on a change in the electrical resistance due to a change in length of the measuring assembly, which in the case of the resistive measuring assembly is based on the change in geometric properties and in the case of the piezoresistive effect is essentially caused by the material. The piezoresistive change in the resistance due to a strain of the measuring assembly is significantly stronger (k-factor), particularly in the case of (doped) semiconductors, and preferably allows for more sensitive and more accurate strain measurements. A change in resistance can preferably be measured by changing the voltage applied to the measuring assembly in a Wheatstone bridge. These measuring devices are known to the person skilled in the art. A person skilled in the art also knows which materials he must preferably use in order to obtain a (piezo-)resistive measuring assembly and, when producing such a measuring assembly, also takes into account factors such as any anisotropic (piezo-)resistive and/or elastic properties of the material, such as those preferably occurring in semiconductor materials in particular.

A piezoelectric measuring assembly is preferably based on a material-inherent generation of an electrical voltage by compressive and/or tensile forces acting on the assembly. A person skilled in the art knows which materials and/or material mixtures and which structuring of the material are preferably suitable for a piezoelectric measuring assembly.

Both a (piezo-)resistive and a piezoelectric measuring assembly are preferably mounted between two regions and structured in such a way that essentially no force is exerted by the measuring assembly on the regions when there is a measurable strain and/or change in distance between the regions. For this purpose, the measuring assembly is preferably slightly expandable and/or elastic along the axis.

An inductive measuring assembly is preferably based on the strength of the current produced by a variable magnetic field. Therein, the measuring assembly can, e.g., comprise an oscillating circuit with a coil between two regions on one side or an end point in one region, which oscillating circuit generates a magnetic field constantly changing over time, while it comprises on the other side or the other end in the second region an electrical conductor in which a current is induced by the changing magnetic field depending on the distance of the coil. As a result of the distance dependency, a (changing) distance between the two regions can be determined, which can be converted into a measurement of the strain on the object between the two regions. An inductive measuring assembly based on the change in the inductance of a coil can also be preferred, e.g., a differential transformer with a movable core, which influences the coupling factor to two secondary coils, a linear variable differential transformer or an inductive ring sensor, in which the effective air gap of a magnetic circuit is changed and/or a magneto-inductive distance sensor and/or an eddy current sensor.

A particular advantage here is that the two ends or sides of the measuring assembly can be separated, as the induction is based on the electrical field and does not require a physical transmission medium. Therefore, essentially no forces are exerted on the two regions by the measuring assembly and the strain measurement is particularly sensitive, precise and error-free.

An optical measuring assembly, which is present between two regions, preferably measures strains between the regions via a distance measurement, which can also measure changes in the distance, that is to say, strains. Such a measurement is based, for example, on an interferometric measurement in which, via overlaying coherent optical signals, information about their phase difference can be read out. This phase difference in turn preferably contains information about the distance between the regions. A person skilled in the art can implement such an optical measuring assembly by using suitable optical components, such as a light source (laser), beam splitter and light detectors (photodiodes). Such an optical measuring assembly based on interferometry makes it possible to carry out ultra-precise strain measurements. However, an optical measuring assembly based on the analysis of a transit time measurement of an optical signal is also conceivable. One advantage of the optical measuring assembly is that no physical transmission medium is required and therefore essentially no forces are exerted on the two regions by the measuring assembly. Thus, the strain measurement is particularly sensitive, precise and error-free.

A magnetic measuring assembly can preferably be based on a Hall sensor which generates different voltages, depending on the position within a magnetic field and thus depending on the magnetic flux density it is exposed to. Thus, with a fixed reference magnetic field, the measured voltage can preferably be used to determine the position of the Hall sensor relative to this magnetic field. This measuring principle can be used in particular to measure the distance between the regions, which can be used to measure the strain. A person skilled in the art knows how to implement this principle as a measuring assembly for uniaxial strain measurement. So-called magnetoelastic sensors can also be preferred for realizing the measuring assembly. These are based on the principle of a change in permeability when a suitable material changes in length.

A capacitive measuring assembly is also preferred. These are based on the principle of a measurable change in the capacitance of a capacitor when the distance between the capacitor plates (electrodes) varies. A particular advantage of this measurement method, in addition to the lack of a physical transmission medium and the essentially complete lack of forces exerted between the sides/ends of the measurement assembly in the respective regions, is the versatility of this measurement principle. A plurality of different implementations are conceivable, for example in the form of one capacitor plate per region on each side of the measuring assembly; but (MEMS) comb structures such as those in DE 10 2017 206 183 A1 are also conceivable. Depending on the embodiment, the comb overlap and/or the comb gap can be varied.

In a further preferred embodiment of the invention, the measuring assembly comprises a spring structure which is configured for a resistive, preferably a piezoresistive, piezoelectric and/or a capacitive strain measurement.

A spring structure is preferably an elastic structure in the form of a technical spring. Therein, structures in the form of a bending spring and/or torsion spring can be used, for example. Examples of bending springs are leaf springs, and examples of torsion springs are coil springs. This spring structure is preferably present between two regions and connects the same. In this case, the spring structure can preferably be supported movably in such a way that a strain measurement on the object is preferably essentially not restricted by forces transmitted from the spring structure to the object via the joined region. The spring structure is preferably the only connection between these regions within the strain-measuring structure after being joined with the object and being activated. All preferred embodiments of the spring structure have in common that they can be elastically deformed by strain, bending, shearing and/or torsion. It is particularly preferred that, on the one hand, they have sufficient tension within the measuring range of the measuring assembly that strain leads to a measurable change in shape of the spring structure, which is preferably essentially proportional to the strain, and on the other hand, that they are elastic and soft enough that a strain and/or compression applied to the spring structure only results in small return forces acting on the regions, which might counteract a strain of the object and could distort the measurement. The measuring assembly with a spring structure is preferably configured for a resistive, preferably a piezoresistive, piezoelectric and/or a capacitive strain measurement. This means in particular that a change in shape of the elastic structure resulting from a strain can be measured by a resistive, preferably a piezoresistive, piezoelectric and/or a capacitive strain measurement.

In one embodiment, the spring structure is, for example, designed as a coil spring. The spring itself could consist of a material which makes the compression and/or elongation of the spring measurable by (piezo-)resistive and/or piezoelectrical means. However, regions could also be located in the outer walls of the preferably wire-like element, which forms the coil spring-like structure, which regions make it possible to measure strain by (piezo-)resistive and/or piezo-electrical means. A capacitive measuring assembly is also conceivable in which, for example, the outer walls comprise electrodes which measure a tapered or enlarged area of the wire-like element when the spring structure is compressed or expanded. A subdivision of the coil spring-like structure into segments which comprise electrodes and segments positioned in between the former which preferably comprise a dielectric is also preferably conceivable.

A person skilled in the art knows that a change in distance between the regions between which a spring structure is present preferably does not result in a proportional change in length of the spring structure, as in the case of a linear, one-dimensional structure between the regions, but in a change in shape of the spring structure due to strain, bending, shearing and/or torsion of the spring structure. Therefore, the person skilled in the art knows that, when evaluating the strain measurement, which, e.g., comprises a strain measurement of the spring structure itself based on the aforementioned principles, this change in shape must be taken into account if the strain of the object itself is to be inferred. Therefore, it is preferred to perform a suitable conversion. However, it can be preferred that this effect can be neglected in a measuring range of the strain measurement, such that a measurement of the strain of the spring carried out in this way is essentially proportional to the strain of the object itself along the measured axis. It can also be preferred that the resistive, preferably piezoresistive, piezo-electric and/or capacitive strain measurement by means of the spring structure can detect the change in shape of the spring structure due to strain, bending, shearing and/or torsion of the spring structure itself, e.g., by means of a suitable arrangement of the (piezo-)resistive, piezoelectric and/or capacitive elements and/or a suitable analysis, which is based in particular on theoretical considerations and/or previous measurements/calibrations.

Such a measuring assembly is super-elastic due to the essentially free-standing (apart from the attachment to the joined regions), soft structures, and is therefore also highly sensitive to the smallest strains of the object to be measured.

In a further preferred embodiment of the invention, the measurement assembly comprises a spring structure, wherein said spring structure is a linear structure with two or more bending points and wherein piezoresistive, piezoelectric and/or capacitive regions are present in the bending points, which are configured for a strain measurement.

A bending point or bending region preferably denotes a section in which the linear spring structure has a curvature, i.e., a local deviation from a straight extension. Particularly preferably, the linear spring structure experiences a change of direction at the bending points. The bending points can therefore preferably also be referred to as turning points and give the spring structure its elasticity. For example, the bending points can be characterized by an opening angle, the size of which is predefined by a force acting on the spring structure. The opening angle preferably denotes an angle between the regions of the linear spring structure that enter and exit a bending point. The regions of the linear spring structure that enter and exit a bending point can preferably also be referred to as legs. By increasing an external tensile force, the spring structure experiences an opening of the legs and an increase in the opening angle at the bending points. In the case of a lower tensile force, there is a smaller opening angle between the legs. The opening of the spring structure at the bending points preferably takes place along the longitudinal direction of the spring structure with a correspondingly increased opening angle in the plane of the carrier.

According to the invention, it was recognized that a strain measurement in the bending points is particularly sensitive. The change in shape of the linear spring structure is greatest when there is a change in length at the bending points. For example, inner and outer regions can be defined in relation to the bending points. The inner region preferably denotes that region of a bending point which faces the incoming and outgoing legs, while the outer region denotes the opposite side. When the spring structure is strained, the inner regions are expanded and the outer regions are compressed.

The compression and expansion in the bending points can be determined with high sensitivity by means of piezoresistive, piezoelectric and/or capacitive measuring methods. For example, by doping the side walls of a semiconductor spring structure, local semiconductor strain gauges can be provided, which precisely detect compression or expansion of the spring structure at the bending points. As a result of the localized measurement of the change in shape at the bending points, local expansion and compression are advantageously not averaged, as would be the case for a classic strain gauge applied from above.

In addition, the measuring regions at the bending points are at the same location at the same temperature. The measured compression or expansion of the sensitive regions at the bending points thus very reliably reflects a strain of the spring structure without the measurement results being influenced by temperature fluctuations.

The linear formation of the spring structure particularly preferably has a meandering shape and a plurality of bending points. The spring structure is characterized by a straight longitudinal axis or axis of symmetry about which the linear structure is wound. The turns of the spring structure mark the bending points. For example, the spring structure can be a coil spring.

The curvatures of the spring structure can preferably also be located in one plane. In this case, the linear spring structure is essentially located in one plane and has a curved extension about a longitudinal axis, which is characterized by a plurality of turning points or bending points. The plane in which the spring structures are located preferably corresponds to that plane which is mounted by the carrier (cf. FIG. 1-5).

A plurality of bending points preferably means at least 2, 3, 4, 5, 10, 15, 20, 30, 40, 50 or more bending points. By measuring the changes in shape of the spring structure in a plurality of bending points, the entire strain of the spring structure can be determined with a particularly high degree of precision.

In a further preferred embodiment of the invention, the measuring assembly comprises a gap which is configured for a capacitive and/or an optical strain measurement. This gap is located in particular between the regions between which the measuring assembly is located. A gap is configured in particular for a capacitive measuring assembly if it forms a capacitor together with electrodes, the capacitance of which is measurably varied as a function of the distance between the regions. A person skilled in the art knows how to measure the capacitance itself. This can be done, for example, by charging with a constant current and measuring the rate of voltage rise, measuring a resonance frequency of an LC oscillating circuit and/or applying an alternating voltage to the capacitor and measuring the current curve.

In a preferred form, the gap itself is formed by electrodes (capacitor plates) and directly determines the capacitance of the resulting capacitor. The electrodes can preferably be applied directly to the respective regions of the carrier. It can also be preferred that there is a separated spring structure between the regions, the separated spring having coated ends, between which there is a gap. which essentially form the capacitive measuring assembly. Such a measuring assembly can be implemented in a particularly simple manner; due to the essentially complete lack of forces exerted between the two sides/ends of the measurement assembly in the respective regions, the strain measurement is particularly accurate and error-free.

In a further preferred embodiment of the invention, the spring structure is a MEMS spring structure, preferably a semiconductor MEMS spring structure, which has at least one doped region in a side wall which comprises a semiconductor strain gauge.

By doping the side wall of a MEMS spring structure, piezoresistive properties can be produced and/or reinforced, which are suitable for a local strain measurement. Semiconductor MEMS structures with doped regions in the side wall, from which piezoresistive regions result, are known from WO 2010139034 A2, for example. In the prior art, these are used as sensors for measuring the stresses of the MEMS component in which they are present. This results in advantages from the possibilities of structuring semiconductors for MEMS technology, e.g., high design flexibility, high sensitivities of the sensors, no material fatigue of the MEMS structures, compatibility with CMOS technology, universality of the production technology and simplicity of the structures due to the integrated sensors. In this preferred embodiment, these regions are now to be integrated into elastic structures, in particular spring structures, such that they can be used as a measuring assembly for measuring the strain on an external object. Since preferred semiconductor materials and in particular silicon can be produced very well and have good piezoresistive properties for highly sensitive measurements, but often have a high inherent rigidity, it is particularly preferred that the semiconductor MEMS structures are made sufficiently elastic by means of special structuring, in particular by means of a spring structure, such that the measuring assembly itself essentially does not exert any forces on the object, the strain of which is to be measured. The spring structure is particularly preferably a linear formation with two or more bending points which impart elasticity to the semiconductor MEMS structure.

MEMS structures are in particular structures of microsystems (microelectromechanical system, MEMS for short), which are very compact with dimensions in the (sub-) micrometer range and at the same time have excellent functionality and low manufacturing costs thanks to standardized manufacturing techniques. The designation micrometer range preferably denotes a size range with a characteristic extension between 1 µm and 1000 µm. Preferred MEMS spring structures can, for example, have lengths between 10 µm and 1000 µm, with a lateral extension of less than 100 µm, preferably less than 50 µm, particularly preferably less than 10 µm.

It is preferred that semiconductor strain gauges are implemented in the side walls of the spring structure via the doped regions, which thus implement the uniaxial strain measurement of the measuring assembly via a strain and/or deformation measurement. The side walls of the spring structure are in particular parts of the outer shell of an essentially wire-shaped and/or strip-shaped structure, which forms a linear formation, e.g., a helical spring structure, by means of a suitable arrangement. Multiple doped regions can be present in the form of strips parallel to one another or opposite one another along the longitudinal direction of the spring. These can be present in regions or along the entire length of the spring structure.

The doped regions are particularly preferably located in the bending points of the spring structure. As explained above, when the measuring assembly is strained, there is a local compression or expansion of the spring structure, particularly at the bending points. Inner regions or side walls of the spring structure are preferably expanded when the spring structure is strained, while outer regions or side walls are preferably compressed. The designation 'inner' and 'outer' regions preferably relates to a longitudinal axis or axis of symmetry of the spring structure, about which the spring structure has a curved shape with corresponding bending points.

It is particularly preferred that two regions that are spatially close to one another are always installed in a half bridge and in particular that four regions that are spatially close to one another are installed in a full bridge. The Wheatstone Bridge is known to a person skilled in the art as a measuring device for strain gauges. If four semiconductor strain gauges of the spring structure which are spatially close to one another are present in a full bridge, temperature drift in particular can be compensated for as a source of error in the strain measurement, as it preferably has the same effect on all semiconductor strain gauges. In particular, due to the compact MEMS design, the semiconductor strain gauges experience the same physical influences from temperature changes, etc. These can thus be compensated in a full bridge.

In the case of a (semiconductor) MEMS spring structure, embedded semiconductor strain gauges which are preferably implemented by suitably doped regions of the semiconductor, can be located, for example, on two to four opposite sides of the side walls of a spring structure, which, for example, has the shape of a wound wire (which preferably has an essentially round or rectangular cross section). If the distance between two regions of the strain-measuring structure is changed due to a strain of the object to be measured, the MEMS spring structure is strained, wherein this strain also is transferred to the semiconductor strain gauges in its side walls and can thus be measured by them. Particularly when the semiconductor strain gauges are positioned at the bending points of the spring structure, an extremely troublefree and sensitive strain measurement can be implemented.

In this case, the total strain of the object in the axis or direction measured by the measuring assembly can be inferred, for example, by suitable upscaling. Likewise, multiple points with opposing semiconductor strain gauges can preferably be located in the respective sides of the side walls of the MEMS spring structure. Contiguous semiconductor strain gauges can also preferably be present on the spring structure along the longitudinal direction.

Such a strain-measuring structure is highly sensitive due to the sensitive mechanical measuring structure, especially when the semiconductor sensors are implemented in full bridge, and is super-precise due to measuring resistors at the same temperature and/or under the same stress, in the same size and with the same technology.

The very small form factor of the MEMS structures allows in particular for the integration of multiple strain gauges for local multi-axial measurements, with which the complete stress tensor can advantageously be determined. In particular, it is therefore preferred to provide two or more MEMS spring structures which connect different regions of the carrier to one another in order to ensure a multidimensional strain measurement. In contrast to classic strain gauges, the MEMS structures are characterized by extremely small dimensions in the micrometer range. The spatial proximity of the MEMS spring structures for the various axes reduces measurement errors due to possible temperature fluctuations.

Such structures have a surprising temperature compensation and linearity in the strain measurement while at the same time having negligible stiffness, as semiconductor and in particular silicon structures preferred in the prior art did not have these properties up to now.

Furthermore, a greater, and therefore improved, dynamic measuring range can be achieved over long distances due to the elasticity ($>10^6$ scale intervals). The range of measurable changes in strain is also very high due to the small dimensions and resulting low inertia of the structure. With a semiconductor MEMS measuring assembly, a k-factor many times higher than that of resistive measuring assemblies can be achieved (approx. 100 instead of approx. 2). Furthermore, the strain gauges of this preferred variant are particularly flexible in design thanks to the diverse design options of this basic idea and due to the sophisticated manufacturing techniques, especially for semiconductor (silicon) MEMS structures. The spring structures that can be implemented in this way have a high level of sensitivity over a wide measuring range thanks to the elasticity of the structures over a large compression or expansion range. The linearity of the signal is also greatly improved over the entire measuring range compared to devices for strain measurement of the prior art. The preferred semiconductor structures and in particular the silicon or silicon structures are fatigue-free due to their material and due to the structuring, which improves the robustness and longevity of the device. The preferred strain-measuring structure has a high immunity to object expansions outside of a preferred measurement direction and/or plane. Furthermore, due to the great freedom of design with many degrees of freedom, greatly improved possibilities for fine control of experimental parameters are given. Conventional materials and production devices can be used in the production.

Due to the piezoresistors, which are located directly in the spring structure, the strain-measuring structure is particularly compact. The noise of a semiconductor MEMS structure with doped regions is greatly improved compared to devices for strain measurement of the prior art. The production is particularly compatible with standard CMOS technology, which reduces production costs and saves time. Universal manufacturing technologies can be used, which makes production even cheaper, saves material costs and maintains a high degree of flexibility in production. This results in low production costs at a high volume of items, as well as easily realizable mass production in MEMS technology.

In a further preferred embodiment of the invention, the (semiconductor) MEMS spring structure comprises at least four semiconductor strain gauges, which are installed in at least one full bridge. With four active "sensors" in a measuring assembly for strain measurement in a full bridge (instead of usually only one strain gauge), a physical temperature compensation is carried out, as "measuring resistors" (semiconductor strain gauges) are present in the smallest space at the same temperature. The result is an almost ideal characteristic curve for the measuring assembly. The four semiconductor strain gauges also experience essentially the same mechanical amounts of stress. This results in improved sensitivity, offset, linearity, scale factor temperature coefficient (SFTC) and/or zero temperature coefficient (ZTC). TC generally stands for temperature coefficient; TCR particularly describes the coefficient for the change in resistance as a function of temperature (an undesirable but physically unavoidable influence on the measurement—in the prior art, sometimes higher in the signal than the measurement of the strain). In this embodiment, the TCR is compensated for via a measuring bridge, as changes in resistance with different signs are signal-effective here and identical changes cancel each other out. In the present case, this works particularly well due to the spatial proximity of the measuring resistors. The temperature coefficient SFTC of the bridge output voltage or the relative bridge output voltage across the load (sensitivity) should theoretically be zero, but in the prior art it often is not, due to geometrical asymmetries and real different temperatures of the individual resistors. Because of these asymmetries, an undesired signal offset occurs at the same time at the load zero point (bridge output not equal to zero, despite no load). This is also temperature-dependent and has a temperature coefficient ZTC, which in turn makes electronic or digital compensation more difficult. Due to the spatial proximity of the measuring resistors in the full bridge, these temperature coefficients are greatly improved in the embodiment described.

In this embodiment, a high and improved accuracy in determining the local stress tensor can be realized. Due to the very small structure, a small error in lateral gradients can be achieved in the strain measurement; all measuring transducers (semiconductor strain gauges) are essentially in one plane (the plane in which the measuring assembly is located), whereby errors due to multilayer systems with an "out-of-plane" stress reduction can be avoided. In the prior art, having multiple strain gauges in one bridge is known only in the form of strain gauge rosettes, which are present in different directions and experience different loads and/or temperatures due to their large size and arrangement at non-identical locations. Therefore, these prior art bridge arrangements are not comparable in terms of sensitivity and minimization of errors.

In a further preferred embodiment of the invention, a substrate of the measuring assembly is selected from a group comprising semiconductor materials, preferably comprising silicon, monocrystalline silicon, polysilicon, silicon dioxide, silicon carbide, silicon germanium, silicon nitride, nitride, germanium, carbon, gallium arsenide, gallium nitride and/or indium phosphide. These materials are particularly easy and inexpensive to process in semiconductor and/or microsystem production and are also well suited for mass production. These materials are also particularly suitable for doping and/or coating in order to achieve the desired electrical, thermal and/or mechanical properties in certain regions.

The materials can advantageously be microstructured and/or produced using an additive micro-production method.

In a further preferred embodiment of the invention, the measuring assembly comprises a polymer. A measuring assembly comprising polymers is particularly simple and inexpensive to produce, while being robust and low-maintenance. The use of polymers is particularly suitable for simple and inexpensive standard strain-measuring structures.

In a further preferred embodiment of the invention, the carrier comprises a polymer. A frame structure refers in particular to a structure which is essentially formed by a contiguous outer boundary of a flat region that remains free and which surrounds this surface. The frame structure is preferably stable and rigid. In the case of an angular frame shape (triangular, quadrangular or generally polygonal outline), the individual edges, which preferably essentially form the frame structure, are in particular called struts. A frame structure is preferably a quadrangular arrangement of struts connected to one another at the corner points within a plane. The predetermined breaking points can preferably be located at the corners of the frame, but in particular at any points on the struts, and separate the frame into different regions. A frame structure offers particularly diverse possibilities for the arrangement of one or more measuring assemblies, which preferably span the frame from one side to the other and are present between at least two regions. At the same time, a strain-measuring structure comprising a frame structure is particularly light and yet robust. A frame structure is particularly suitable for an improved strain measurement along a surface of an object, in particular a surface which lies in a two-dimensional plane.

In a further preferred embodiment of the invention, the frame structure comprises at least three regions, wherein a measuring assembly is present between each region and at least one other region, wherein the strain-measuring structure is a strain measuring rosette which is configured for a multi-axial strain measurement. Strain-measuring rosettes, which have multiple strain gauges in different directions, are known from the prior art. Biaxial stress/strain states can be fully determined by using such rosettes. Known arrangements from the prior art are the 45° right-angle rosette and the 60° delta rosette. In contrast to the strain gauge rosettes known from the prior art, it is not the strain gauges which are arranged in different directions, but rather the measuring assemblies. These can have multiple individual measuring sensors or elements for strain measurement, as already described above for the semiconductor strain gauges of the MEMS spring structure, which, for example, can be present in a full bridge within a single measuring assembly. In the case of the present strain gauge rosette, at least two measuring assemblies can be arranged in a manner known from the prior art, which connect at least three regions of the strain-measuring structure that are no longer directly connected to one another after activation, which are joined separately to a surface of the object and which therefore allow a high level of measurement sensitivity. Due to the preferably compact design of the strain gauge rosette, very precise statements can be made about the strain of an object in different directions of a plane.

In a further preferred embodiment of the invention, the carrier comprises a frame structure which forms a contiguous outer boundary of an inner region and wherein the frame structure comprises at least three regions which are separated by predetermined breaking points and wherein at least one region of the frame structure is connected with the at least two other regions by means of measuring assemblies. The frame structure allows for a flexible provision of different strain gauge rosettes for determining the two-dimensional strain of an object.

The measuring assemblies are particularly preferably MEMS spring structures, which are formed, for example, in the form of lines or wires from a semiconductor material and whose strains at the bending points can be determined with high precision. The use of MEMS spring structures allows sensors to be provided for multi-axial strain measurements in the smallest of spaces. In this case, use is preferably made of the fact that the shape of the MEMS spring structures changes in their bending points. In particular when the MEMS spring structures are formed from semiconductor materials, they are fragile and brittle on their own. The frame structure advantageously ensures a high level of stability for handling the strain-measuring structure, in particular before it is attached to an object to be measured. After the strain-measuring structure has been joined to the object, as described, the predetermined breaking points are activated, such that the frame structure separates into the defined regions, and the measuring assemblies detect the two-dimensional expansion of the object with high accuracy.

In a preferred embodiment of the strain gauge rosette described above, the frame is rectangular and the four struts of the frame comprise predetermined breaking points located approximately centrally transverse to the longitudinal direction of the struts. The frame is thus preferably divided into four regions, with respective measuring assemblies located between three regions and the fourth region, i.e., a total of three assemblies, all of which have a side/an end in a corner of the fourth region of the frame structure and each extend to one of the three other corners of the frame structure in each of the three other regions. The measuring assemblies are arranged like a 45° right-angled rosette of the prior art at angular distances of 45° from one another. It can also be preferred that the rectangular frame structure can be divided into three regions by the predetermined breaking points, wherein a first region is formed by a strut of the frame structure and the other regions each are formed by L-shaped elements, each of which comprise a further strut and half of a strut arranged perpendicular to said strut. The three measuring assemblies are preferably located between the respective corners of the L-shaped elements and the center of the strut which forms the first region, and preferably form a measuring assembly analogous to a 60° delta rosette of the prior art.

As mentioned, each individual measuring assembly can have multiple individual measuring sensors or elements for strain measurement, such as, e.g., the semiconductor strain gauges described above. These can in particular be present in a full bridge. In this way, a very sensitive and greatly improved strain measurement can be provided, even for multi-axial/multi-dimensional strain measurements of the object to be measured. A measuring assembly can also comprise multiple full bridges, whereby a multi-dimensional strain measurement can be further improved.

In a further preferred embodiment of the invention, the alignment of the measuring assemblies in the frame structure is configured to compensate for anisotropic elastic and/or piezoresistive properties of the substrate (preferably of the measuring assembly). It is known that preferably semiconductor materials and in particular silicon can have anisotropic elastic and/or piezoresistive properties. To ensure that said properties do not distort the strain measurement in a measuring assembly, for example, in a semiconductor MEMS spring structure with semiconductor strain gauges, this effect can be minimized by suitable structuring of the measuring assembly and/or a suitable evaluation of the strain measurement carried out by the measuring assembly. However, depending on the application and structure, there may still be anisotropies that can influence the strain measurement. This is the case in particular with a strain measurement in more than one direction, since a measuring assembly can then likewise experience a strain, i.e., an expansion and/or compression not only along the preferred axis. Since strain gauge rosettes are typically used for such measurements, anisotropy can preferably be compensated for by individual arrangement or alignment of the measuring assemblies, which compensates for anisotropy. The alignment can preferably comprise the angle that is present between the measuring assembly and a parallel line of an edge of an angular frame structure. Likewise, the alignment can preferably be specified in the form of an angle which is formed between the aligned measuring assembly and a standard measuring assembly of a strain gauge rosette. A person skilled in the art knows how to arrange the measuring assemblies in order to compensate for anisotropies. The anisotropies of the measuring assembly are basically known and depend on the material and/or structure. Anisotropies of certain properties are preferably given in the form of a tensor. The preferred directions in which a strain measurement is to be carried out are also known. Thus, a person skilled in the art can make calculations and/or simulations, preferably on a computer, by means of which he can discover a preferred configuration, in particular an alignment, especially in the form of an angle, of the measuring assemblies of the strain measuring rosette, by means of which anisotropies can be compensated for.

In a further preferred embodiment of the invention, a substrate of the carrier is selected from a group comprising semiconductor materials, preferably comprising silicon, monocrystalline silicon, polysilicon, silicon dioxide, silicon carbide, silicon germanium, silicon nitride, nitride, germanium, carbon, gallium arsenide, gallium nitride and/or indium phosphide. These materials are particularly easy and inexpensive to process in semiconductor and/or microsystem production and are also well suited for mass production. The carrier structure can be manufactured surprisingly flexibly due to the materials and/or the manufacturing methods. Particularly in connection with a substrate of the measuring assembly also comprising semiconductor materials, a particularly simple production and/or a production from a single common substrate for the measuring assembly and carrier is possible, whereby the production is further simplified and made less expensive, and whereby a particularly compact, robust and/or flexible shaped strain-measuring structure can be provided.

In a further preferred embodiment of the invention, the carrier comprises a polymer. In this way, inexpensive and simple strain-measuring structures can be produced, in particular in connection with a measuring assembly also made of a polymer.

In a further preferred embodiment of the invention, the carrier is configured for mechanical and/or thermal activation. The activation preferably describes the separation and/or controlled breaking of the carrier into the regions. The separation should preferably take place after the strain-measuring structure has been joined to an object, such that the basic structure of the device is retained, wherein the arrangement is then held together not by the carrier but by the regions joined to the object. The individual regions preferably move with the strained surface of the object, wherein this expansion can be measured between the regions by means of the measuring assembly. The separation and/or controlled breaking of the carrier should preferably be achieved by a force and/or energy introduced in a targeted manner at the predetermined breaking points, wherein the carrier and/or predetermined breaking point are configured to yield due to the added form of energy and/or force. If mechanical activation is provided, the predetermined breaking point is preferably configured by a tapered area and/or partial perforation of the support structure at the predetermined breaking point, such that a targeted mechanical force, e.g., in the form of pressure and/or by cutting, provides for a yielding and/or separation of this weakened structure along the predetermined breaking point. Furthermore, being configured for a mechanical activation can preferably mean that the strain-measuring structure comprises a device, in particular an actuator, by means of which the mechanical force can be triggered. The actuator can, e.g., be selected from the group comprising electrostatic actuator, piezoelectric actuator, electromagnetic actuator and/or thermal actuator. The actuator can in particular be a MEMS actuator. The actuator can furthermore preferably be configured for activation by a control device. Mechanical activation is particularly easy to control.

Thermal activation can also be preferred. This can be realized, for example, by a heating wire at the predetermined breaking point. The material itself can also be configured for thermal activation by means of a tapered area and/or partial perforation of the carrier structure at the predetermined breaking point. In particular, the carrier material and/or the material of the predetermined breaking point is suitable to ensure that the carrier melts or breaks at the predetermined breaking point due to the thermal energy introduced. In some implementations, the predetermined breaking point can consist of a different material than the rest of the carrier. The thermal activation, e.g., by means of a material to be heated, can be configured for activation by a control device. Thermal activation can also be implemented, for example, by a laser, the radiation of which provides thermal energy when absorbed at the predetermined breaking point. Activation by thermal energy is particularly easy to implement. Likewise, thermal activation is preferably particularly gentle on the object and/or the remaining strain-measuring structure and distorts the measurement particularly little.

In a further preferred embodiment of the invention, the carrier comprises at least one electrical heating element for thermal activation. An electrical heating element is preferably an element which generates heat in the form of a Joule effect by applying an electrical voltage and/or electrical current. The electrical heating element preferably comprises a MEMS heating element which is formed by a finely structured conductive material, e.g., in the form of a coating. The heating element preferably comprises a contact for electrical control. Such a heating element can be implemented in a particularly simple and compact manner.

In a further preferred embodiment of the invention, the carrier is configured for electrical and/or chemical joining. Electrical joining comprises, in particular, soldering, melting and/or welding, which is triggered and/or supported by the supply of electrical energy. By means of electrical joining, each region in the joining zone is preferably joined to the object. It is preferred that the material of the carrier, in particular of the region, and/or the material of the object are suitable for electrical joining by soldering, melting and/or welding, in which they at least partially melt at the temperature provided in the respective processes and then cure, whereby an integrally joined connection is preferably created between the joining zone of the region and the object. It is preferred that the carrier itself has a device in the form of an electrically conductive wire, an electrically conductive tip and/or an electrode in order to melt, solder and/or weld the object. The device is preferably controllable by means of a control device such that remote-triggered joining is made possible. Likewise, electrical joining can be achieved by novel, electrically conductive adhesive materials, which are in a liquid state in a first state and heated by current flow and can thereby be made to harden and preferably to integrally join. Electrical joining can also be controlled remotely by means of a control device, such that joining even very small and/or difficult-to-access strain-measuring structures is very easy to do.

Chemical joining comprises, in particular, gluing. The person skilled in the art knows which adhesives are suitable for joining certain materials, environmental properties (temperature, humidity) and/or surfaces. Chemical joining can also be triggered remotely, e.g., by providing thermal energy in the form of a Joule effect (generated electrically) and/or electromagnetic radiation, e.g., by means of a laser, which preferably causes the adhesive to harden.

Direct joining using the energy provided by electromagnetic radiation from a laser in the form of melting, soldering and/or welding is also possible. In particular in the case of an electrically triggered and/or laser-triggered joining, it is possible to implement an integrated device and activation as well as joining, in particular in a single process.

So-called reactive joining is particularly preferred. Reactive joining refers in particular to a method for applications in electrical or microsystem technology in which special properties of so-called reactive multilayers are used. Reactive multilayers comprise a stack of material layers, preferably a few nanometers thick, which, upon suitable, preferably thermal, activation (ignition), can release thermal energy for a soldering process in an exothermic reaction. The reaction preferably results in the formation of an alloy, wherein the released energy causes the layer system to be heated. As a result, solder layers are preferably melted in order to carry out a soldering process between two joining partners. In this case, the joining partners are preferably pressed together in order to improve the resulting soldered connection. The reactive multilayers (Ni/Al and Pd/Al multilayers, with or without an additional solder layer) used with preference are produced in particular by sputtering. The reactive multilayers are then preferably structured by photolithography and wet chemical etching processes, lift-off methods and/or by means of lasers. The ignition of the reactive multilayers is preferably initiated by an electrical spark. A suitable device for generating an electrical spark is preferably comprised, wherein it is particularly preferred that it can be controlled (externally) by a control device. With this method, the surprisingly short exposure times of the thermal energy results in an extremely low thermal load on the joined elements, and temperature-sensitive objects can also be joined advantageously. Furthermore, this leads to low mechanical stresses after the joining process, which improves the strain measurement. The reactive layers can preferably be structured with the laser, whereby, surprisingly, complex geometric structures can also be realized. In addition, the joined connections are preferably metallic and, in particular, mechanically strong and stable over the long term and have good electrical and thermal conductivity.

This embodiment, in particular the joining by means of electrical provision of thermal energy, allows for a considerable simplification of the sensor mounting. In particular, the MEMS strain gauge rosette is preferably electrically activated at the same time, i.e., the chip frame is broken by electrical heating. As a result, the strain-measuring structure is robust in its handling, as the activation only takes place after being mounted (and joined) on the object. In this way, a robust, multi-axial semiconductor strain gauge with high sensitivity can be provided, which can be joined electrically (also controlled remotely) and preferably also activated by means of electrical control. Therefore, the handling is preferably particularly simplified; the cost of materials and handling, in particular for typical gluing, can in part be dispensed with. A kind of plug & play strain-measuring structure is created, which can be mounted immediately without curing time (apply, switch on, done).

In a further preferred embodiment of the invention, the carrier is configured for electrical contacting and/or wireless transmission of electrical energy. In this embodiment, the electrical energy is to be transmitted between the strain-measuring structure and an evaluation and/or control device. The transmission of electrical energy preferably fulfills at least one of the following purposes: control and reading out of the measuring assembly by transmitting electrical signals; triggering the joining, e.g., by transferring the electrical energy for the local provision of heat in the joining zone; and/or electrically controlled activation of the strain-measuring structure, e.g., by means of an actuator or via a Joule effect. Electrical contacting can preferably be done by direct transmission of electrical energy through wires and/or cables, wherein the carrier comprises suitable contacts for electrical contacting and/or wiring and/or conductor tracks on the carrier itself, which, e.g., connect the carrier with the measuring assembly to be read out. Likewise, the electrical energy can preferably be transmitted wirelessly, e.g., by electromagnetic radiation, in particular inductively and/or capacitively. For this purpose, the carrier can have at least one electrode and/or coil for capacitive and/or inductive transmission of electrical energy, in addition to internal wiring and/or conductor tracks. The control and/or evaluation device can preferably have a suitable counterpart.

The control and/or read-out device preferably comprises a processor, for example a microprocessor. Other integrated circuits that are used in digital electronics for control can also be used. The transmission of electrical energy is preferably selected with regard to the transmittable bandwidth of the signals etc. in such a way that, for example, the measuring assemblies can be read out with the appropriate measurement accuracy and/or rate.

In this embodiment, the strain-measuring structure can be controlled, i.e., in particular joined, activated and/or read out, externally in a particularly simple manner. The structure itself can be particularly compact and can be located in inaccessible places on the object to be measured.

In a further aspect, the invention relates to a method for producing a strain-measuring structure according to the above description, the production comprising the following steps:

etching a substrate for the carrier and/or the measuring assembly;
   preferably structuring the carrier and/or the measuring assembly;
   preferably doping the side walls of the measuring assembly for integrating at least one semiconductor strain gauge;
   preferably electrical contacting of the carrier.

One of the preferred materials mentioned above can be used as a substrate, for example. During the etching, a blank, for example a wafer, can be brought into the desired basic shape of the strain-measuring structure. In a next step, parts of the measuring assembly are preferably doped such that at least one piezoresistive region is created. If further structuring of the structure is desired, this can be conducted by further etching processes, for example. Additional material can also be deposited.

Suitable material, such as copper, gold and/or platinum can be additionally deposited on the conductive material by commonly used processes. Physical vapor deposition (PVD), chemical vapor deposition (CVD) or electrochemical deposition can preferably be used for this purpose.

In this way, a particularly finely structured strain-measuring structure, e.g., a MEMS structure, can be produced, which preferably has dimensions in the micrometer range and the desired functional properties. These manufacturing steps have also proven to be particularly effective and are part of standard method steps in semiconductor processing.

In a preferred embodiment of the production method, etching and/or structuring is selected from the group comprising dry etching, wet chemical etching and/or plasma etching, in particular reactive ion etching, deep reactive ion etching (Bosch process); and/or a doping method is selected from the group comprising diffusion, ion implantation and/or neutron transmutation doping.

These methods are particularly suitable for the production of fine structures with dimensions in the micrometer range and/or for semiconductor processing and/or doping. In particular, the Bosch process can produce very fine structures with a high aspect ratio, which are extremely advantageous for a functional, compact and efficient structure.

In a further aspect, the invention relates to a system comprising
  a) a previously described strain-measuring structure;
  b) a control device,
  wherein the control device is configured for reading out the measuring assembly and preferably for electrical and/or chemical joining and/or activation of the strain-measuring structure.

The control device preferably enables an input and converts this input into suitable control signals. An input can be, for example, a signal for joining, for activating and/or for controlling the measuring assembly. The control device then primarily generates corresponding analog electrical signals which are passed on to the structure. Likewise, the control device preferably enables an output signal of a measuring assembly to be applied as an input signal, which is converted by the former into measuring signals that can be evaluated. In this manner, these signals can preferably be transferred, e.g., in digital form, to a computer for further evaluation and/or storage. Reading out can include sampling and/or converting (e.g., analog-to-digital converter). For example, an analog measurement signal, e.g., in the form of an electrical voltage, can be converted into a digital signal for evaluation by a PC.

The use of such a system comprising a suitable control device can considerably simplify the desired use of the strain-measuring structure. A control device is preferably located externally, at a distance from the strain-measuring structure, wherein the transmission between the structure and the control device can be wireless and/or wired. The control device can also be integrated on the strain-measuring structure. A control device, in particular in the form of a controller integrated into the emitter, is very compact and easy to use. The control device preferably has a suitable interface for connecting to a computer, for example. Further data, such as current temperature data of the structure, other status information and a signal for switching the strain-measuring structure on and off can be transmitted between control device and structure.

In a further aspect, the invention relates to a method for measuring the strain on an object, comprising
  providing a strain-measuring structure or system as described above;
  joining the strain-measuring structure to an object;
  activating the strain-measuring structure;
  reading out the at least one measuring assembly.

The average person skilled in the art recognizes that technical features, definitions and advantages of preferred embodiments of the strain-measuring structure according to the invention and of the system also apply to the method according to the invention. Preferably, several of the steps of joining, activating, reading out, in particular all steps, can be automated and/or controlled via the control device.

In a further aspect, the invention relates to a use of a strain-measuring structure or a system according to the above description for a strain measurement on an object. Herein, too, the average person skilled in the art recognizes that technical features, definitions and advantages of preferred embodiments of the strain-measuring structure according to the invention and of the system also apply to the method according to the invention. In particular, the strain-measuring structure enables surprisingly precise and error-free strain measurements to be carried out. Even very small objects and/or surfaces of objects can preferably be measured. Even places that are difficult to access, for example in the interior of an object, can now be measured particularly easily and precisely.

Measurements can also be made with an unprecedented precision which was not known in the prior art. This is mainly due to the fact that each region can be joined to the object individually via the joining zone and the strain-measuring structure essentially does not exert any forces on the object to be measured that influence the strain measurement.

DETAILED DESCRIPTION

In the following, the invention is to be explained on the basis of examples and figures, without being restricted to the same.

DETAILED DESCRIPTION OF THE DRAWING

Figure 1:
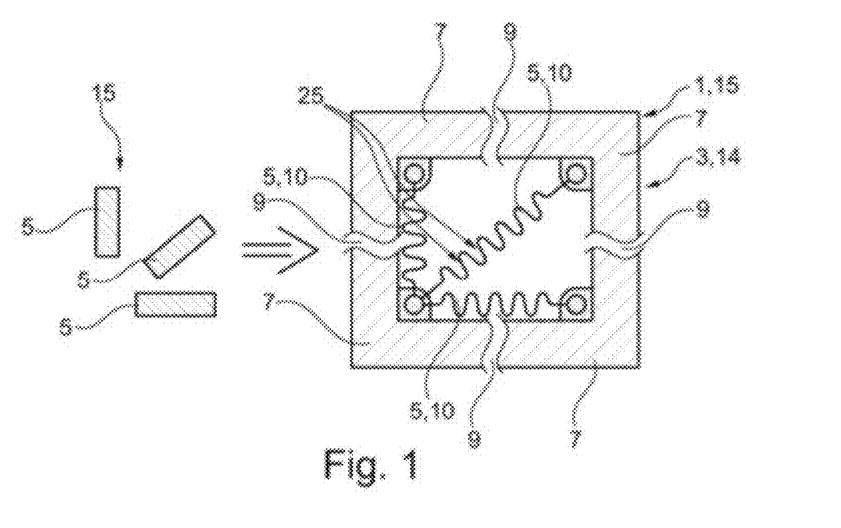
FIG. 1 is a schematic representation of the strain-measuring structure in a top view.

On the right, FIG. 1 shows a schematic representation of the strain-measuring structure 1 in a top view. It can be connected to an object 11 via joining zones 13 and strain measurements can be carried out on it, e.g., via a surface of the object 11. The structured carrier 3 has a frame structure 14. This frame-shaped carrier 3 has four predetermined breaking points 9, which divide the frame structure into four regions 7. All regions can be joined separately to the object 11 to be measured at the respective joining zones 13. The regions 7 should be held together at the predetermined breaking points 9 in the unjoined state. Only after the strain-measuring structure 1 has been joined to an object 11 is the carrier 3 separated (activated) into the regions 7 along the predetermined breaking points 9. The measuring assemblies 5, which, as shown, have a spring structure 10 and can measure a strain along it, are present between each region and at least one other region and connect the same. A strain-measuring rosette 15 is formed in this manner. Strains of the object 11 along the measured surface in any direction, which are noticeable due to changing distances between regions 7, are measured by respective measuring assemblies 5 (spring structures 10). An overall picture of the strain of the object 11 results from an evaluation of the strains measured by the various measuring assemblies 5. This is a 45° right-angle rosette, as made clear by the arrangement of the measuring assemblies 5.

On the left in FIG. 1, a 45° right-angle strain-measuring rosette 15 of the prior art with strain gauges 5 arranged at 45° angles to one another is shown schematically.

The illustration on the left in FIG. 1 is intended to illustrate the orientation of the strain gauges in the prior art and not to explain any size relation. The strain-measuring structure 1 according to the invention, in particular when using MEMS spring structures 10, can have significantly smaller dimensions than is the case for strain gauges of the prior art.

Figure 2:
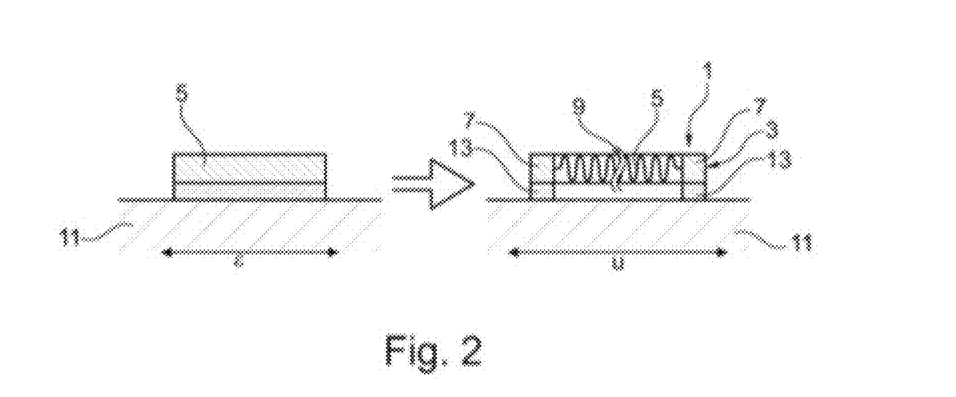
FIG. 2 is a schematic representation of a strain-measuring structure joined to an object in a side view.

FIG. 2 shows a schematic representation of a strain-measuring structure 1 (right) joined to an object in a side view. A measuring assembly 5 of the prior art is shown on the left. This is glued over the entire surface of the object 11 to be measured, for example a substrate. One disadvantage here is that the adhesive itself has a certain stiffness that distorts the measurement.

In the case of the strain-measuring structure 1 according to the invention, on the other hand, the various regions 7 of the carrier 3 separated by at least one predetermined breaking point 9 are joined separately to the surface of the object 11 at their respective joining zones 13. Essentially, it is not the stiffness of the adhesive, as in the prior art, but the actual strain of the object 11 that is measured by the measuring assembly 5. For this purpose, the strain-measuring structure 1 is activated by separating the carrier 3 into the regions 7 at the predetermined breaking points 9 after joining.

Figure 3:
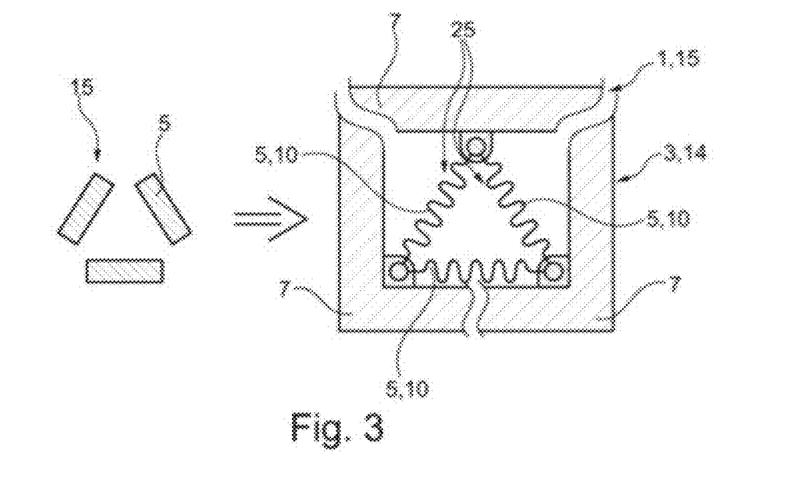
FIG. 3 schematically shows an arrangement of a strain measuring rosette with spring structures.

FIG. 3 schematically shows a further arrangement of a strain-measuring rosette with spring structures. This is a so-called 60° delta rosette, as its basic structure is also known from the prior art (left in the figure). The measuring assemblies 5 in the form of spring structures 10 represent a connection of three regions 7 of the carrier 3 interrupted by three predetermined breaking points 9 in the form of a frame structure 14 in the form of an equilateral triangle.

Figure 4:
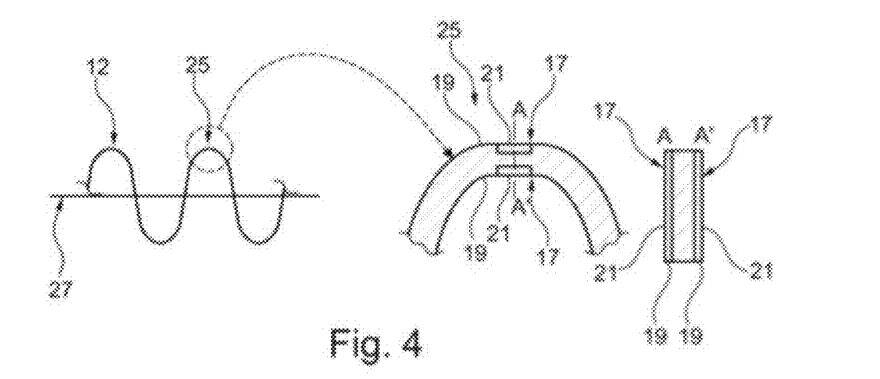
FIG. 4 schematically shows a semiconductor MEMS spring structure with semiconductor strain gauges in the side walls.

FIG. 4 schematically shows a semiconductor MEMS spring structure 12 with semiconductor strain gauges 21 in the side walls 19 of the spring structure. The right, enlarged section of the left measuring assembly 5 in the form of a (semiconductor) MEMS spring structure 12 shows semiconductor strain gauges 21 embedded in the side walls 19 on two opposite sides. These can, e.g., be implemented by suitably doped regions 17 of the semiconductor. As illustrated, the doped regions 17 of the semiconductor or strain gauges 21 are preferably implemented at the bending points 25 of the spring structure 10, which react particularly sensitively to a change in length of the spring structure 10.

If the distance between two regions 7 of the strain-measuring structure 1 is changed due to an expansion of the object 11 to be measured, the MEMS spring structure 12 is strained, wherein this expansion also is transferred to the semiconductor strain gauges 21 in its side walls 19 and thus can be measured by the same.

In particular, the opening angle of the bending points 25 increases, wherein semiconductor strain gauges 21 are present, which are configured to measure the local compression or expansion that occurs in the process.

As illustrated in FIG. 4, it is preferable to arrange respective semiconductor strain gauges 21 on opposite sides, such that the compression or expansion can be measured for an inner and outer region of the bending point 25. The inner region is located at the bottom of the illustrated bending point 25 and faces the longitudinal axis 27 of the spring structure 10. When the spring structure 10 is strained, this region is expanded. The outer region is located at the top of the illustrated bending point 25 (FIG. 4, left) and faces away from the longitudinal axis 27 of the spring structure 10. When the spring structure 10 is strained, this region experiences a compression.

The measurement of the compression or expansion of the semiconductor strain gauges 21 at the particularly sensitive regions 25 of the spring structure 10 allows for the change in the strain-measuring structure 1 to be monitored with high precision. In this case, the total strain of the object 11 in the axis or direction measured by the measuring assembly 5 can be deduced, for example, by suitable upscaling. Likewise, multiple semiconductor strain gauges 21 in the form of doped regions or contiguous semiconductor strain gauges 21 can preferably be present in the respective sides of the side walls 19 of the MEMS spring structure 12. On the far right, a further enlarged section of the semiconductor strain gauges 21 embedded in the side walls 19 on two opposite sides, e.g. by means of doped regions 17, is shown.

The regions identified in FIG. 4 as strain-measuring structure 21 can also preferably be electrodes of a capacitive measurement sensor. If the spring structure 12 is expanded, for example, the structure becomes tapered or narrower in the transverse direction by an elongation of the material in the longitudinal direction. This brings the plates closer together, which means that a capacitive strain measurement can also be implemented.

Figure 5:
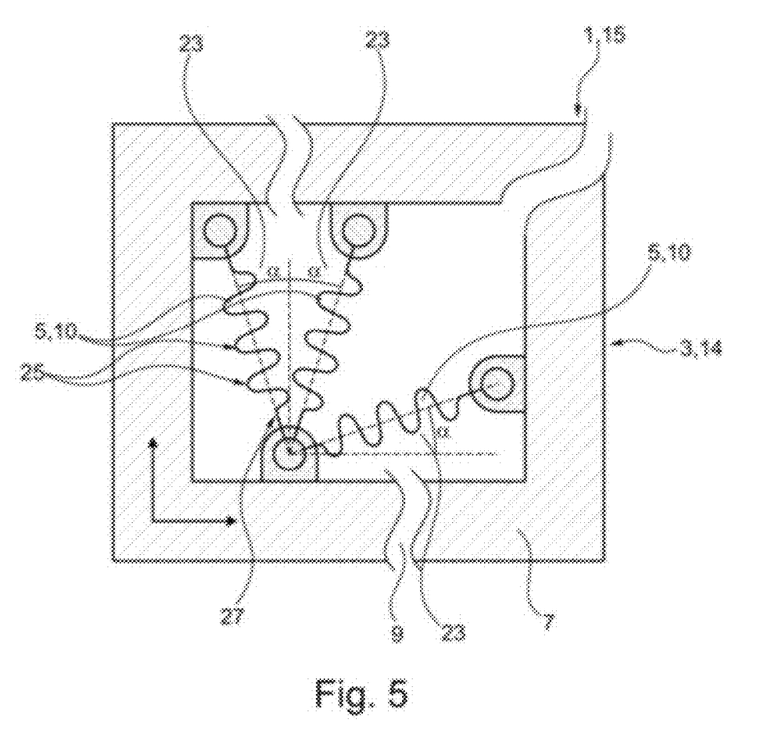
FIG. 5 schematically shows an adaptation of the strain measuring rosette to the anisotropic properties of the substrate of the measuring assemblies.

FIG. 5 schematically shows an adaptation of the strain-measuring rosette 15 to the anisotropic properties of the substrate of the measuring assemblies 5. The individual measuring assemblies 5 in the form of a spring structure 10 are not arranged like a conventional 45° right-angle strain-measuring rosette, but have a different orientation 23, represented by an angle α. This is adapted to anisotropic elastic and/or piezoresistive properties of the substrate of the measuring assemblies 5 and is intended to compensate for them such that when the measuring assemblies are evaluated, the result corresponds to that of a 45° right-angle strain-measuring rosette, the strain gauges of which have no anisotropic properties.

LIST OF REFERENCE SYMBOLS

1 Strain-measuring structure
3 Carrier
5 Measuring assembly
7 Region
9 Predetermined breaking point
10 Spring structure
11 Object
12 MEMS spring structure
13 Joining zone
14 Frame structure
15 Strain-measuring rosette
17 Doped region
19 Side wall of the spring structure
21 Semiconductor strain gauge
23 Orientation (angle)
25 Bending points of the spring structure
27 Longitudinal or symmetry axis of the spring structure

The invention claimed is:

1. A strain-measuring structure for measuring strain on an object, comprising:
 a structured carrier, and
 at least one measuring assembly for uniaxial strain measurement,
 wherein the carrier has at least two regions which are separated from one another by a predetermined breaking point, wherein the measuring assembly is present between two regions, each region can be joined to the object in a joining zone and wherein the predetermined breaking point is configured to activate the strain-measuring structure by separating the carrier into the regions,
wherein the measuring assembly comprises a spring structure, wherein the spring structure is a line-shaped formation with two or more bending points,
wherein piezoresistive, piezoelectric and/or capacitive regions are being provided in each of the two or more bending points, and
wherein the measuring assembly is configured for a localized strain measurement in each of the two or more bending points by means of piezoresistive, piezoelectric and/or capacitive regions.

2. The strain-measuring structure according to claim 1, wherein the measuring assembly comprises a gap which is configured for a capacitive and/or an optical strain measurement.

3. The strain-measuring structure according to claim 1, wherein the measuring assembly comprises a MEMS spring structure, which has at least one doped region in a side wall which comprises a semiconductor strain gauge.

4. The strain-measuring structure according to claim 3, wherein the MEMS spring structure comprises at least four semiconductor strain gauges, which are installed in at least one full bridge.

5. The strain-measuring structure according to claim 1, wherein a substrate of the measuring assembly and/or of the carrier comprises a semiconductor material.

6. The strain-measuring structure according to claim 5, wherein the semiconductor material comprises silicon, monocrystalline silicon, polysilicon, silicon dioxide, silicon carbide, silicon germanium, silicon nitride, nitride, germanium, carbon, gallium arsenide, gallium nitride and/or indium phosphide.

7. The strain-measuring structure according to claim 1, wherein the carrier comprises a frame structure, wherein the frame structure comprises at least three regions, wherein a measuring assembly is present between each region and at least one other region, wherein the strain-measuring structure is a strain measurement rosette which is configured for a multi-axial strain measurement.

8. The strain-measuring structure according to claim 1, wherein the carrier comprises a frame structure, which forms a continuous outer boundary of an inner region and wherein the frame structure comprises at least three regions, which are separated by predetermined breaking points and wherein at least one region of the frame structure is connected to the at least two other regions by measuring assemblies.

9. The strain-measuring structure according to claim 8, wherein the alignment of the measuring assemblies in the frame structure is configured to compensate for anisotropic elastic and/or piezoresistive properties of a substrate of the measuring assembly.

10. The strain-measuring structure according to claim 1, wherein the carrier is configured for mechanical and/or thermal activation.

11. The strain-measuring structure according to claim 1, wherein the carrier is configured for electrical and/or chemical joining, for electrical contacting and/or wireless transmission of electrical energy.

12. A method for producing a strain-measuring structure according to claim 1, wherein the production comprises the following steps:
etching a substrate for the carrier and/or the measuring assembly;
structuring the carrier and/or the measuring assembly;
doping the side walls of the measuring assembly for integrating at least one semiconductor strain gauge; and
electrical contacting of the carrier.

13. The method according to claim 12, wherein:
the etching and/or structuring is selected from the group comprising dry etching, wet chemical etching, plasma etching, reactive ion etching, and deep reactive ion etching (Bosch process); and/or
the doping is selected from the group consisting of diffusion, ion implantation and neutron transmutation doping.

14. A system comprising:
a) a strain-measuring structure according to claim 1;
b) a control device wherein the control device is configured for reading out the measuring assembly.

15. The system according to claim 14, wherein the control device is further configured for electrical and/or chemical joining and/or activation of the strain-measuring structure.

16. A method for measuring strain on an object comprising:
providing a strain-measuring structure according to claim 1;
joining the strain-measuring structure to an object;
activating the strain-measuring structure; and
reading out the at least one measuring assembly.

17. A method of measuring strain on an object comprising using a strain-measuring structure according to claim 1.

18. A strain-measuring structure, for measuring strain on an object, comprising:
a structured carrier, and
at least one measuring assembly for uniaxial strain measurement,
wherein the carrier has at least two regions which are separated from one another by a predetermined breaking point, wherein the measuring assembly is present between two regions, each region can be joined to the object in a joining zone,
wherein the predetermined breaking point is configured to activate the strain-measuring structure by separating the carrier into the regions,
wherein the carrier is configured for thermal activation and
wherein the carrier comprises at least one electrical heating element for thermal activation.

19. The strain-measuring structure according to claim 18, wherein the measuring assembly is configured for a resistive, a piezoresistive, a piezoelectric, an optical, a magnetic, an inductive and/or a capacitive strain measurement.

20. The strain-measuring structure according to claim 18, wherein the measuring assembly comprises a spring structure which is configured for the strain measurement.

21. The strain-measuring structure according to claim 20, wherein the spring structure is a line-shaped formation with two or more bending points and wherein piezoresistive, piezoelectric and/or capacitive regions are present in the bending points, which are configured for the strain measurement.

* * * * *

UNITED STATES PATENT AND TRADEMARK OFFICE
CERTIFICATE OF CORRECTION

PATENT NO. : 12,013,296 B2
APPLICATION NO. : 17/288473
DATED : June 18, 2024
INVENTOR(S) : Bittner et al.

It is certified that error appears in the above-identified patent and that said Letters Patent is hereby corrected as shown below:

In the Specification

Column 1, Line 56, delete "1-2‰" and insert -- 1-2% --.

Column 3, Line 50, delete "$\varepsilon=\Delta I/I_o$," and insert -- $\varepsilon=\Delta l/l_o$, --.

Column 3, Line 51, delete "$\Delta I$" and insert -- $\Delta l$ --.

Column 3, Line 51, delete "$I_o$" and insert -- $l_o$ --.

Column 4, Line 46, delete "approximately," and insert -- 'approximately,' --.

Column 10, Line 45, delete "FIG." and insert -- FIGS. --.

Column 11, Line 5, delete "gap." and insert -- gap --.

Signed and Sealed this
Fifth Day of November, 2024

Katherine Kelly Vidal
Director of the United States Patent and Trademark Office